United States Patent [19]

Webster

[11] Patent Number: 4,884,591
[45] Date of Patent: Dec. 5, 1989

[54] RECONNECTABLE FRANGIBLE BALL VALVE COUPLING

[75] Inventor: Alexander P. Webster, Concord, Mich.

[73] Assignee: Aeroquip Corporation, Jackson, Mich.

[21] Appl. No.: 239,408

[22] Filed: Sep. 1, 1988

[51] Int. Cl.⁴ ............................................. F16L 29/00
[52] U.S. Cl. ....................................... 137/68.1; 285/2; 285/84
[58] Field of Search ........................... 137/68.1, 614.06; 251/313; 285/2, 3, 84, 317

[56] References Cited

U.S. PATENT DOCUMENTS

| | | | |
|---|---|---|---|
| 4,090,524 | 5/1978 | Allread et al. | 137/68.1 |
| 4,351,352 | 9/1982 | Meisenheimer, Jr. | 137/68.1 |
| 4,596,272 | 6/1986 | Medvick et al. | 137/614.06 X |
| 4,614,201 | 9/1986 | King et al. | 137/68.1 |
| 4,643,216 | 2/1987 | Allread et al. | 137/68.1 |

FOREIGN PATENT DOCUMENTS 1082195  5/1960  Fed. Rep. of Germany .......... 285/2

Primary Examiner—John Fox
Attorney, Agent, or Firm—Beaman & Beaman

[57] ABSTRACT

A frangible fluid couping wherein at least one coupling part includes a self closing valve. Frangible interlocking component interconnect the coupling parts under normal conditions and the interlocking structure includes weakened portions which fracture upon the coupling being subjected to severe impact, such as during an aircraft crash, permitting the coupling parts to separate. The frangible interlocking component include manually releasable structure permitting the coupling parts to be selectively disconnected for test purposes, and a safety lock is utilized to prevent inadvertent release of the interlocking structure.

10 Claims, 2 Drawing Sheets

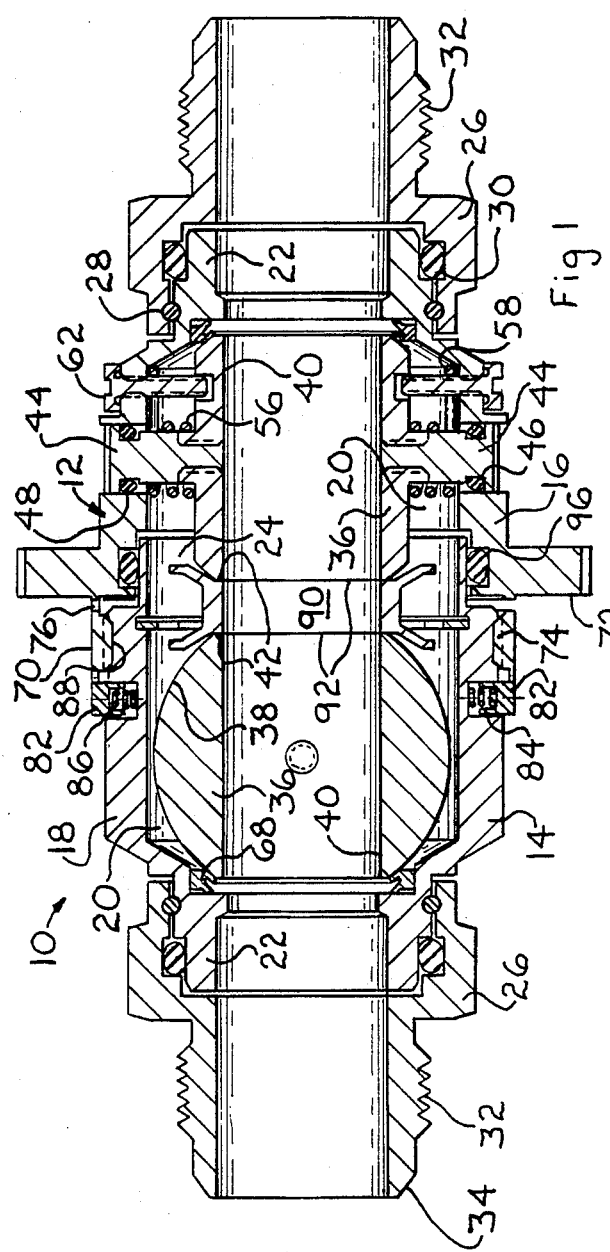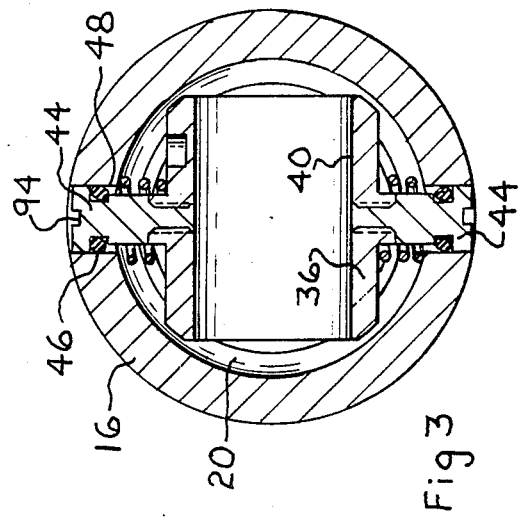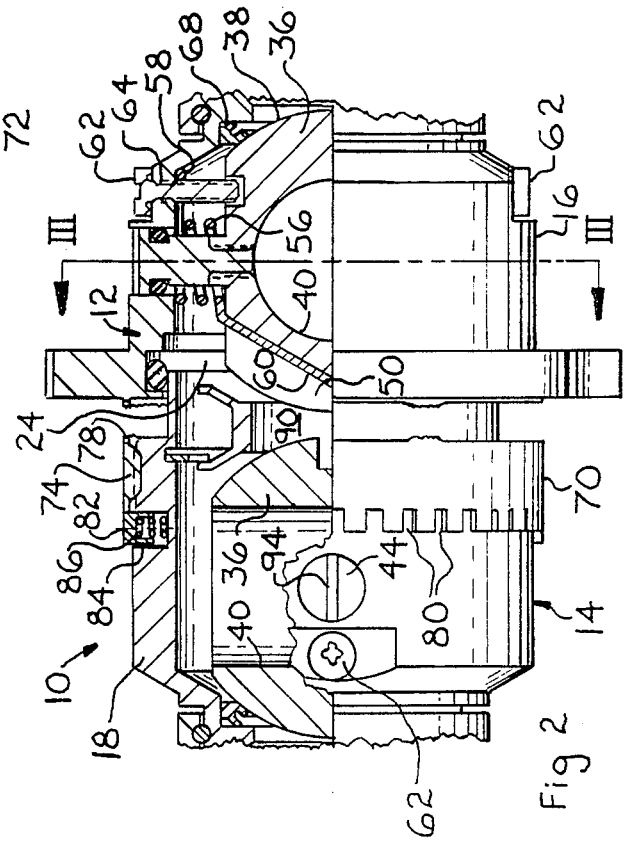

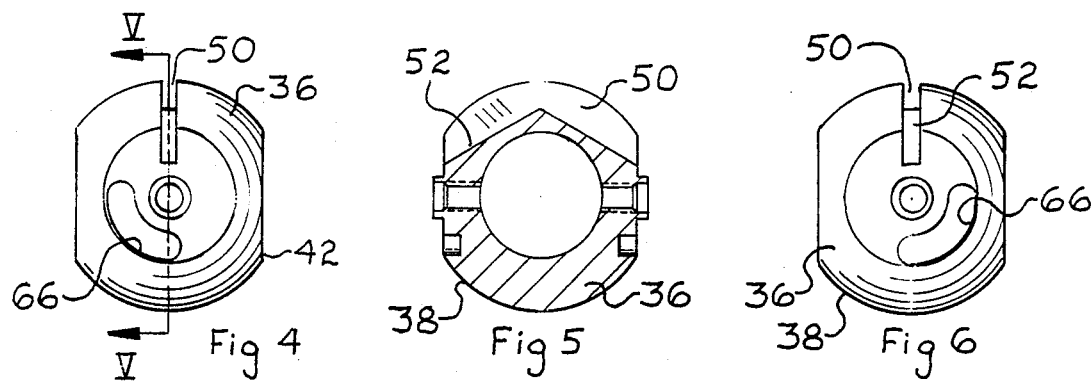
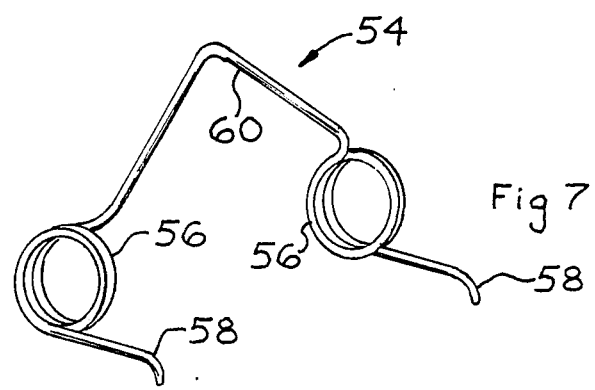
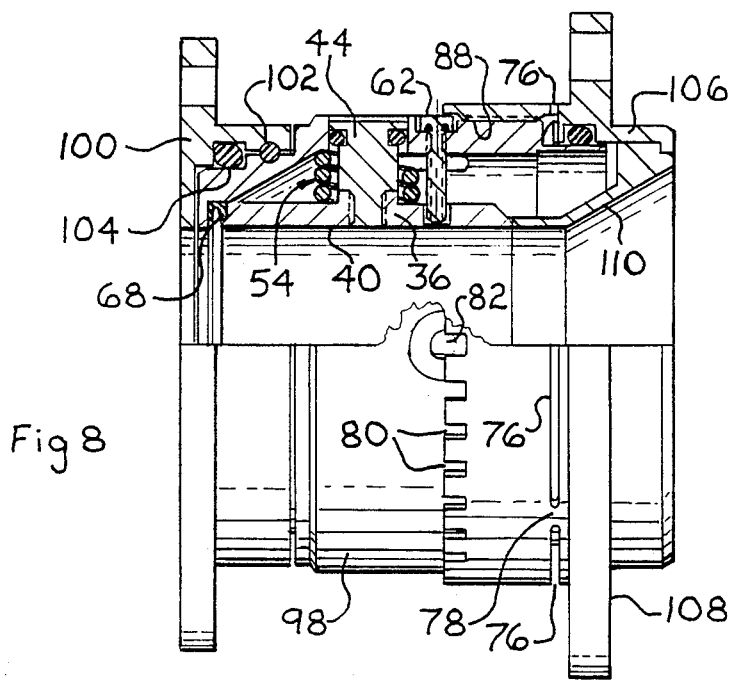

RECONNECTABLE FRANGIBLE BALL VALVE COUPLING

BACKGROUND OF THE INVENTION

In fluid systems for aircraft, race cars, and in other applications where spillage of inflammable fuel or liquid may occur due to high impact forces being imposed upon the vehicle it is known to employ "crashworthy" couplings. Such couplings include frangible structure for interconnecting the valve bodies, and usually, the frangible structure is defined by weakened pins or portions utilized in the coupling interlocking components. In the event of a crash, high tension or bending forces applied to the coupling parts causes the weakened portions to fracture permitting the coupling halves to separate. Usually, each coupling half or part includes a self-sealing valve which is maintained in its open position when the coupling is in its normal operating mode. However, upon the coupling halves separating spring forces imposed upon the valves bias the valves to the closed condition preventing fluid flow and leakage from the associated conduit, such as a hose line.

While such crashworthy couplings have proven to be fairly dependable in operation, occasionally, a valve within a coupling part may lock, bind or corrode while in the open position and not rotate to its closed position in the event of a crash. Thus, there is a definite need to be able to test frangible couplings for fluid handling lines, but heretofore, such testing was not possible as the frangible interlocking structure for the coupling parts must be fractured before the coupling parts can be separated and the valve operation observed or tested. Previously, it was not possible to test a frangible coupling without destroying the interlocking structure.

It is an object of the invention to provide a frangible coupling for fluid systems utilizing at least one self-closing valve wherein the frangible interlocking means for the coupling parts may be operated to disengage the parts without damage thereto and the coupling parts may be reconnected to an operable condition.

A further object of invention is to provide a reconnectable frangible fluid system coupling wherein the coupling parts are interconnected by frangible components, and yet the parts may be selectably disconnected for testing purposes.

Yet another object of the invention is to provide a reconnectable frangible fluid coupling utilizing frangible interlocking apparatus for interconnecting the coupling parts wherein safety lock structure is employed in conjunction with the interlocking means to prevent inadvertent release thereof.

A fluid coupling in accord with the invention basically consists of two interconnectable parts each having a passage extending therethrough and each having an attachment end for communication with a fluid source such as a hose, conduit tank, or the like. In the most common embodiment the coupling consists of two parts each of which is attached to a hose end, and each part includes a self-sealing valve. In another version, only one of the parts may incorporate a self-sealing valve, and the coupling parts may be ridgedly mounted to a receptacle such as a fuel tank.

In the disclosed embodiments the passage of the valved coupling parts includes a rotary valve having a diametrical bore defined therein of a diameter substantially equal to the part passage diameter. Thus, when the valve bore is in alignment with the coupling part passage unrestricted flow through the coupling occurs. The rotary valve is associated with sealing seat structure as is well known and the valve rotates about a diametrical axis transversely disposed to the valve bore wherein a 90° rotation of the valve is sufficient to move the valve between its fully opened and fully closed positions. A torsion spring biases the valve toward its closed position, and stop structure limits valve rotation between its operative positions.

The two parts of the coupling are interconnected by interlocking structure. Such interlocking structure takes the form of a circumferencial extension defined on one of the coupling parts which overlaps the other coupling part and is affixed there to. In the most common embodiment, the interlocking structure utilizes mating threads on the respective coupling parts to achieve interlocking.

The axially extending circumferencial interlocking extension defined upon one of the coupling parts includes weakened portions capable of fracturing in the event of high impact forces being applied to the coupling. These weakened frangible portions are of sufficient strength to maintain the coupling parts interconnected during normal operating conditions, but upon exceptional bending or tension forces being applied to the coupling parts the weakened portions, or webs, will fracture permitting the coupling parts to separate.

The valves, or valve, of the coupling parts is maintained in its opened condition due to engagement with restraining structure associated with the other coupling part, and upon separation of the coupling parts the restraining structure maintaining the valves in the open position is rendered inoperative permitting the valves to be quickly rotated by their associated biasing spring to the closed position to prevent fluid loss and leakage.

To prevent inadvertent release of the interlocking means a safety lock in the form of spring biased detent pins is employed. A plurality of detent pins are mounted in one of the coupling parts which cooperate with recesses defined in the interlocking structure of the other coupling part such that upon the coupling parts being fully interconnected the safety detent pins are received within recesses and the interlocking structure of the coupling parts cannot be released without positive and purposeful actuation of the safety lock detent pins by an operator.

The releasable aspects of the interlocking structure for interconnecting the parts of a frangible coupling permits the coupling to be tested to insure that the valves are operable and will rotate to the closed position in the event of impact and fracture of the webs. The construction of the invention produces no flow restriction through the coupling, and valve operation is substantially instantaneous to prevent spillage.

BRIEF DESCRIPTION OF THE PREFERRED EMBODIMENTS

The above mentioned objects and advantages of the invention will be appreciated from the following description and accompanying drawings wherein:

FIG. 1 is an elevational, sectional, view of a reconnectable frangible ball valve coupling in accord with the invention illustrated in the operable condition, FIG. 2 is a detail, partially sectioned view of the coupling of FIG. 1 illustrated during the initial stages of separation upon fracture of the frangible webs, the valves being shown in the closed position, FIG. 3 is an elevational, sectional, view taken along Section III-III of FIG. 2, FIG. 4 is an end view of a ball valve constructed in accord with the invention, FIG. 5 is an elevational, sectional, view of the ball valve of FIG. 4 as taken along section V-V thereof, FIG. 6 is an end elevational view of the ball valve illustrating the end opposite to that shown in FIG. 4, FIG. 7 is a perspective, enlarged, view of the torsion spring associated with a ball valve, and FIG. 8 is an elevational, partially sectioned, view of another embodiment of reconnectable, frangible, ball valved coupling in accord with the invention.

DESCRIPTION OF THE PREFERRED EMBODIMENTS

Crashworthy couplings of the type herein described are often employed in aircraft and auto racing applications, and in particular, are used in fuel systems wherein the leakage or spillage of inflammable liquids presents hazards to human life. Such self-sealing couplings are often used in conjunction with self-sealing or non-rupturing fuel tanks.

With reference to FIGS. 1-7, a typical coupling utilizing the inventive concepts of the invention is illustrated, such coupling being of the type incorporated into a flexible hose fuel line system.

The coupling 10 basically consists of a pair of coupling parts 12 and 14. The coupling part 12 consists of an annular body 16 while the coupling part 14 includes the body 18 as the primary component. Many of the internal components of the bodies 16 and 18 are identical and identical reference numerals are utilized to designate such components. Each body includes an axially extending passage 20, and the passage intersects the associated body conduit attachment end 22, and the bodies open ends 24. At the conduit attachment ends each conduit body is provided with a rotatable externally threaded adapter 26 which employs a drive wire 28 located within a groove to rotatably mount the adapter on the associated part body, and the adapter is sealed to the associated body by an O-ring 30. A conventional hose fitting, not shown, is threadedly mounted upon the adapter threads 32 and sealed with respect to the surfaces 34 in the known manner. Thus, it will be appreciated that the coupling 10 may be used to interconnect two flexible hose lines.

Fluid flow through each coupling part passage 20 is controlled by a rotatable valve 36. The valves 36 are of an external spherical configuration having an outer surface 38, and a diametrical bore 40 extends through each valve defining a flat intersection 42 at the surface 40 and the diameter of the bore is substantially equal to the diameter of the bore of the associated adapter 26 as will be appreciated from FIG. 1. The rotary valves 36 each include a pair of axles 44 having an coincidental axis diametrical to the valve and at right angles to the valve bore 40. Each axle may be received within a threaded hole in the associated valve and includes an O-ring 46 associated with a bore 48 defined in the associated coupling part body wherein the valve will be rotatably supported within its associated valve body in a manner appreciated from the drawings.

Each rotary valve is externally notched at 50 forming a V-shaped notch surface 52, FIG. 5, and as will be appreciated from FIG. 5, the notch 50 intersects the spherical surface 38 of the valve. A torsion spring 54, FIG. 7, at each end includes a coil 56, a tail 58, and the central portion 60 is of a V-configuration corresponding to the notch surface 52. Thus, it will be appreciated that the spring coils 56 may circumscribe the valve axles 44 while the central region 60 is totally received within the notch 50 as will be appreciated from FIG. 2.

A stop screw 62 is received within a threaded hole 64 in each coupling bodies adjacent the axle bore 48 which extends toward the associated rotary valve 36. Adjacent each axle 44 each valve is provided with an arcuate slot, FIGS. 4 and 6, which receives the end of a screw 62, FIGS. 1 and 2. The ends of the slots 66 define abutments for engagement with the ends of the screw to restrict rotation of the valves to 90° wherein engagement of the screw with one end of the slot aligns the valve bore 40 with the axis of the associated coupling body, while engagement of the screw with the other end of the slot locates the valve bore 90° with respect to the coupling body axis as shown in FIG. 2. The spring coil tails 58 engage the screws 62 thereby fixing the coils against rotation, and initially, the spring coils 56, screws 62 and tails 58 are assembled such that a biasing rotative force is imposed on the associated valve tending to rotate the valve to its closed position as shown in FIG. 2. The fact that the force exerted on the valves by the springs 54 is located at the notches 50 permits high torque forces to be created.

Annular resilient seals 68 located within the coupling parts passages utilize lips to produce a sealed relationship with the associated spherical valve surface 38, and the seals 68 provide the desired sealed relationship at both the open and closed valve positions.

The coupling parts 12 and 14 are held in a connected relationship by interlocking structure, and this interlocking structure takes the form of an annular circumferential axially extending projection 70 extending from the radial shoulder 72 of the coupling part 12. The projection 70 is internally threaded at 74, and is provided with a plurality of slots 76, FIG. 8, which extend through the radial thickness of the projection. These slots 76 are best illustrated in the embodiment of FIG. 8. The slots 76 are not circumferentially continuous as to intersect each other, but rather are interrupted at several locations to provide a plurality of weakened webs 78, and the webs 78 form frangible portions in the interlocking structure.

At its outer end, the projection 70 is provided with a plurality of recesses 80 as will be appreciated from FIGS. 2 and 8, and the recesses are of a generally rectangular configuration.

The other coupling part 14 is provided with a pair of diametrically opposed safety lock detent pins or buttons 82 each received within a recess 84. The pins 82 are biased outwardly by a compression spring 86, and stop means, not shown, limit the outward movement of the detent pins. The pins 82, in their outward position as shown in FIGS. 1 and 2, are in a lock position receivable within a recess 80, the pins being of a configuration complementary to the recesses 80. By manually depressing the detent pins inwardly out of alignment with the recesses 80 relative rotation between the coupling parts 12 and 14 may occur. The coupling part 14 is provided with an external thread 88 for mating with the threads 74, and it is the threads 74 and 88 which produce the interlocked relationship between the coupling parts.

When the coupling 10 is in its operative condition an annular stop or retainer ring 90 is interposed between the valves 36 as will be appreciated from FIG. 1. The axially spaced radial surfaces 92 of the retainer 90 engage the exterior surface of the valves at the intersection 42 of the associated valve bore, and the retainer will prevent rotation of the valves and maintain the valves in the open condition shown in FIG. 1.

When the components are in the operative position of FIG. 1, and flexible hose, or other conduits, not shown, are connected to the adapters 26, fluid may flow through the coupling without restriction. Upon impact of sufficient force either tensile or bending forces imposed on the coupling parts will cause the webs 78 to fracture, as shown in FIG. 2, and the coupling parts 12 and 14 will begin to separate as illustrated. Such separation of the coupling parts releases the engagement of the retainer ring 90 with the valves 36 permitting the springs 54 associated with each valve to bias the valve to its closed position as shown in FIG. 2, and the rotation of the valve will cease when the valve bore 40 is perpendicular to the axis of the coupling body part in which it is mounted due to engagement of the screws 62 with the appropriate ends of the slots 66. This rotation of the valves to the closed position of FIG. 2 seals the coupling parts to prevent loss of fluid from the open ends.

When the coupling 10 has been in service for some time it is desirable to test the coupling for operability. Previously, such testing was not possible with frangible couplings without destroying at least portions of the coupling. With the disclosed invention such testing may be readily achieved by removing the hose or conduits from the coupling parts 12 and 14, depressing the detent lock pins 82 from their associated recesses 80, and rotating the coupling parts 12 and 14 relative to each other to disengage the threads 74 and 88. This permits nondestructive separation of the parts 12 and 14 permits the valves to pivot to their closed position permitting the operator to inspect the condition of the coupling and its components.

The frangible coupling may then be reassembled by pivoting the valves 36 to their open positions, which may be accomplished by use of a screwdriver engaging the slot 94 in the ends of the axles 44, and after the retainer ring 90 is positioned as desired, a mandrel, not shown, is inserted through the bores of the adapter valves and retainer ring to maintain alignment and position of the components as the threads 74 are mated with the threads 88. During such threading operation the safety lock detent pins 82 are manually depressed into their associated recesses 84, and upon the coupling parts being fully connected the detent pins 82 are released so as to be received within a recess 80 preventing rotation between the coupling parts 12 and 14. The engagement of the ends of the valves with the retainer ring produces some sealing and O-ring 96 engaging an axial lip on body 18 establishes a fluid-tight relationship between the coupling parts.

The inventive concepts may also be utilized in a coupling having only a single self-closing valve and an embodiment of such a coupling is shown in FIG. 8 wherein reference numerals identical to those previously described are represented by identical or primed reference numerals.

In FIG. 8 the coupling body 98 of an annular configuration rotatably mounts the adapter 100 by means of the drive wire 102 and O-ring 104. The adapter 100 is of the bolt-on flange-type wherein the adapter may be attached to an opening in a tank or the like, not shown.

The coupling body half 106 also uses a flange-type mounting at 108 for attachment to a tank or container, not shown. The coupling part body 98 includes a passage 20' having a rotating valve 36' therein identical to that previously described, and exteriorly, the body 98 is externally threaded at 88'.

The coupling body part 106 includes the axially extending projection 70' which is internally threaded at 74' and in a manner identical to that described above the parts 98 and 106 may be threadedly assembled by manually depressing the detent pins 82' and rotating the coupling parts relative to each other.

Internally, the coupling part 106 includes a retainer sleeve 110 which engages the end of the valve 36' for maintaining the valve in the open condition when the parts are assembled as illustrated in FIG. 8. Upon fracturing of the webs 78', and separation of the parts 98 and 106, disengagement of the valve 36' with the sleeve 110 permits the valve to rotate to the closed position under the influence of its spring 54'.

The embodiment of FIG. 8 is used in those instances where it is desired that only one of the conduits associated with the coupling be self-sealed in the event of separation of the coupling parts.

It will be appreciated that modifications to the inventive concepts may be apparent to those skilled in the art without departing from the spirit and scope of the invention.

I claim:

1. A reconnectable, frangible, valved coupling comprising, in combination, first and second coupling parts each having an axial passage extending therethrough, each part having a conduit attachment end and an open end communicating with the associated passage, a self-closing valve located in each part passage intermediate the associated parts' ends having an open position and a closed position sealing the associated passage, spring means biasing each valve toward its' closed position, readily connectible and releasable interlocking means defined on each part adjacent said open end thereof, said interlocking means of said first part being releasably interlocked with said interlocking means of said second part upon said parts' open ends being aligned in opposed relationship, valve retaining means interposed between said parts' valves when said parts are interlocked retaining said valves in their open positions, and frangible portions defined in at least one of said parts' interlocking means permitting said one interlocking means to fracture upon impact and said parts to separate and permitting said valves to be biased to their closed portions.

2. In a reconnectable, frangible, valved coupling as in claim 1, said interlocking means being manually operable between an interlocked position operatively interconnecting said coupling parts and a release position permitting said coupling parts to separate.

3. In a reconnectable, frangible, valved coupling as in claim 2, a safety lock mounted upon one of said coupling parts manually movable between lock and unlock positions, said safety lock cooperating with a lock receiver defined on said interlocking means mounted on the other coupling part when in said lock position and when said parts' interlocking means are fully connected to prevent inadvertent release of said interlocking means.

4. In a reconnectable, frangible, valved coupling as in claim 3, said safety lock comprising a detent pin movably mounted upon said one coupling part movable between said lock and unlock positions, spring means biasing said detent pin toward said lock position, said lock receiver comprising a safety lock receiving recess defined in said interlocking means mounted on said other coupling part, said detent pin being manually displaceable to said unlock position removing said pin from said recess to release said interlocking means from each other.

5. In a reconnectable, frangible, valved coupling as in claim 1, said self closing valves comprising rotory valves of a spherical configuration each rotatable about a diametrically related axis, said valve spring means comprising a torsion spring imposing a torsional force on its associated valve about said valve's axis.

6. A reconnectable, frangible, coupling comprising in combination, first and second coupling parts each having an axial passage extending therethrough, each part having a conduit attachment end and an open end communicating with the associated passage, a self-closing valve located in said first part passage intermediate said ends thereof having an open position and a closed position sealing the associated passage, spring means biasing said valve toward its closed position, readily connectable and releasable interlocking means defined on each part adjacent said open end thereof, said interlocking means of said first part being releasably interlocked with said interlocking means of said second part upon said parts' open ends being aligned in opposed relationship, valve retaining means defined on said second part engaging said valve when said parts are interlocked retaining said valve in its open position, and frangible portions defined in at least one of said parts' interlocking means permitting said one interlocking means to fracture upon impact and said parts to separate and permitting said valve to be biased to its closed position.

7. In a reconnectable, frangible, valved coupling as in claim 6, said interlocking means being manually operable between an interlocked position operatively interconnecting said coupling parts and a release position permitting said coupling parts to separate.

8. In a reconnectable, frangible, valved coupling as in claim 7, a safety lock mounted upon one of said coupling parts manually movable between lock and unlock positions, said safety lock cooperating with a lock receiver defined on said interlocking means mounted on the other coupling part when in said lock position and when said parts' interlocking means are fully connected to prevent inadvertent release of said interlocking means 9. In a reconnectable, frangible, valved coupling as in claim 8, said safety lock comprising a detent pin movably mounted upon said one coupling part movable between said lock and unlock positions, spring means biasing said detent pin toward said lock position, said lock receiver comprising a safety lock receiving recess defined in said interlocking means mounted on said other coupling part, said detent pin being manually displaceable to said unlock position removing said pin from said recess to release said interlocking means from each other.

10. In a reconnectable, frangible, valved coupling as in claim 6, said self-closing valve comprising a rotary valve of a spherical configuration rotatable about a diametrically related axis, said valve spring means comprising a torsion spring imposing a torsional force on said valve about said valve's axis.

* * * * *